United States Patent
Binetti et al.

(10) Patent No.: US 7,710,864 B2
(45) Date of Patent: May 4, 2010

(54) RECOVERY MECHANISM FOR 10 GE OPTICAL TRANSPORT NETWORK WAVELENGTH DIVISION MULTIPLEXING RING

(75) Inventors: Stefano Binetti, Monza (IT); Luca Della Chiesa, Concorezzo (IT)

(73) Assignee: Cisco Technology, Inc., San Jose, CA (US)

( * ) Notice: Subject to any disclaimer, the term of this patent is extended or adjusted under 35 U.S.C. 154(b) by 1082 days.

(21) Appl. No.: 11/306,908

(22) Filed: Jan. 16, 2006

(65) Prior Publication Data
US 2007/0165517 A1    Jul. 19, 2007

(51) Int. Cl.
*G06F 11/00* (2006.01)
(52) U.S. Cl. .................. 370/218; 370/222; 370/225; 370/235; 370/242
(58) Field of Classification Search ........... 370/223
See application file for complete search history.

(56) References Cited
U.S. PATENT DOCUMENTS 5,781,535 A * 7/1998 Russ et al. ................ 370/248
2003/0043736 A1 * 3/2003 Gonda .................... 370/218
2003/0067871 A1 * 4/2003 Busi et al. ................ 370/222
2004/0076151 A1 * 4/2004 Fant et al. ................ 370/389
2004/0081083 A1 * 4/2004 Sekihata .................. 370/222
2005/0249119 A1 * 11/2005 Elie-Dit-Cosaque et al. .................. 370/236
2006/0002293 A1 * 1/2006 Huck et al. .............. 370/228

* cited by examiner

*Primary Examiner*—Chi H. Pham
*Assistant Examiner*—Shick Hom

(57) ABSTRACT

Methods and apparatus for processing a failure and a subsequent recovery in a ten Gigabit Ethernet (GE) optical transport network (OTN) wave division multiplexing (WDM) ring are disclosed. According to one aspect of the present invention, a device includes a plurality of ports, a sensing arrangement, and a processing arrangement. The ports include a first port that is initially configured to be in a forwarding state, and the sensing arrangement identifies whether the first port is facing or interfaced with a failure associated with the network ring. The processing arrangement being generates at least a first G.709 frame, and inserts at least one bit into the first G.709 frame that indicates that the failure associated with the network ring has been identified if the first port is facing a failure. The processing arrangement forwards the first G.709 frame through the second port.

19 Claims, 7 Drawing Sheets

RECOVERY MECHANISM FOR 10 GE OPTICAL TRANSPORT NETWORK WAVELENGTH DIVISION MULTIPLEXING RING

BACKGROUND OF THE INVENTION

1. Field of Invention

The present invention relates generally to the distribution of an Ethernet stream such as video through networks. More particularly, the present invention relates to a mechanism for efficiently recovering from a failure in an optical transport network wavelength division multiplexing ring through which an Ethernet stream video may be transmitted.

2. Description of the Related Art

The use of networks such as local and metro area networks is becoming increasingly prevalent, and the rates at which data may be streamed has been increasing dramatically. For example, approximately 10 Gigabit Ethernet (GE) rates for the streaming of data are becoming more prevalent.

In synchronous optical network (SONET) and synchronous digital hierarchy (SDH) network architectures, when failures occur, the failures may be recovered fairly rapidly. That is, protection times associated with SONET and SDH networks may be relatively fast, as for example approximately fifty milliseconds (ms) or less. A protection time is an amount of time that elapses between when a failure is detected on a network path and when an alternate route for the network path may be established.

The ability to efficiently recover from failures which occur in networks that support IP and Ethernet video distribution is critical, as dropping packets of video data or significantly delaying the transmission of video data is often unacceptable. In IP and Ethernet networks, to decrease protection times associated with failure recovery, a rapid spanning-tree protocol (RSTP), as specified in IEEE 802.1w which is incorporated herein by reference in its entirety, is often utilized. A RSTP is generally effective in reducing protection times relative to a spanning-tree protocol (STP) as specified in IEEE 802.1d which is incorporated herein by reference in its entirety. However, a RSTP generally does not allow protection times of approximately fifty ms or less to be achieved.

A resilient packet ring (RPR) protocol, which is a layer 2 protocol relative to the Open Systems Interconnection (OSI) standard which is incorporated herein by reference in its entirety, initiates ring wraps in the event of a failure within a ring, e.g., a wave division multiplexing (WDM) ring, that supports 10 GE traffic. The protection mechanism associated with the RPR protocol redirects traffic to an original destination by sending the traffic in the opposite direction around the ring after a failure is detected. Though generally effective in reducing protection times to approximately fifty ms, an RPR protocol generally requires each node in a ring to implement specialized logic associated with the RPR protocol. Hence, the costs and management associated with the RPR protocol may be prohibitive. Moreover, current RPR engines which run at 10 G or more are generally not mature, and may be very expensive.

Therefore, what is needed is a method and an apparatus which allows protection times associated with a WDM ring to meet requirements for Ethernet video distribution over an IP or Ethernet network without requiring specialized logic. That is, what is desired is a system which is efficient and allows for a fast recovery to be achieved within a network that supports 10 GE traffic.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In networks, particularly networks that support IP and Ethernet traffic, a fast recovery mechanism that allows a failure in the network to be compensated for is critical to ensure that the quality of service associated with the networks is acceptable. For example, when Ethernet traffic is carried over a wave division multiplexing (WDM) ring, any protection time that exceeds approximately fifty milliseconds (ms) may be considered to be unacceptable, particularly when the Ethernet traffic is video traffic.

Utilizing bits, as for example bits in the header or overhead, of a G.709 optical transport network (OTN) frame, as defined by the ITU-T G.709 standard which is incorporated herein by reference in its entirety, to propagate failure information through a WDM ring to a root node or a root bridge allows the failure information to be efficiently provided to the root node. The root node may then effectively cause traffic in the WDM ring to be routed to substantially avoid the failure by opening a different loop from a layer 2 perspective. The recovery time, or the protection time, associated with utilizing the header of a G.709 frame to propagate failure information may be relatively low, as for example less than approximately fifty ms.

When a failure or a fault, e.g., a failure or a fault on a communications link, is detected by a node of a ring such as a WDM ring, the node that detects the failure sets bits in the header of a G.709 frame to indicate that the failure has been detected. The detecting node then causes the G.709 frame to be sent to a master node or a root bridge, via any intermediate nodes in the ring on the path between the detecting node and the master node. The intermediate nodes detect and propagate the G.709 frame to the master node which moves a port from a blocking state to a forwarding state upon detection of the G.709 frame.

Figure 1:
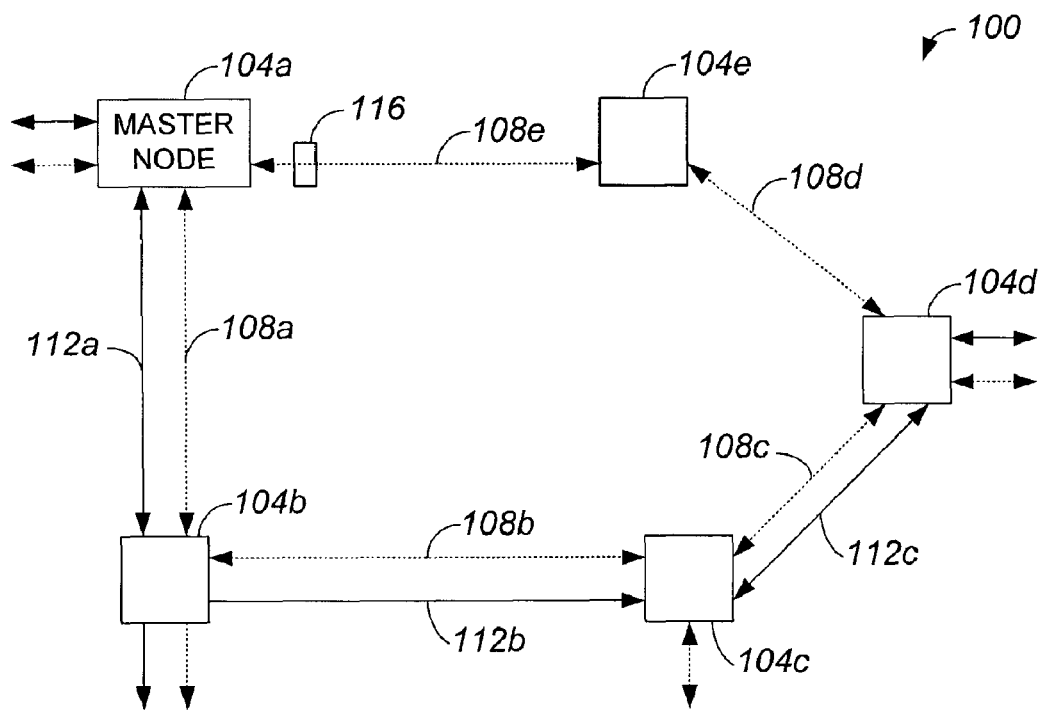
FIG. 1 is a block diagram representation of a network with a wave division multiplexing (WDM) ring in accordance with an embodiment of the present invention.

FIG. 1 is a block diagram representation of a network with a WDM ring in accordance with an embodiment of the present invention. A network 100 includes nodes 104a-e that are in communication over links 108a-e and links 112a-c. Nodes 104a-e may generally be any suitable network device. Suitable network devices include, but are not limited to, add/drop multiplexers, transponders, servers, routers, and various computing devices. When nodes 104a-e are transponders, the transponders may be GE transponders that are substantially pure layer 2 devices as defined Open Systems Interconnection (OSI) standard, which is incorporated herein by reference in its entirety. As will be appreciated by those skilled in the art, layer 2 is a data link layer and allows data to be received and transmitted over a physical layer.

Links 108a-e may each be associated with a protected virtual local area network (VLAN) while links 112a-c may be associated with an unprotected VLAN. Traffic, as for example traffic including multicast packets, is typically flooded for each protected VLAN around network 100. Hence, traffic is flooded or propagated on at least some of links 108a-e. It should be appreciated that a VLAN may be associated with a 10 GE pipe, and that each 10 GE pipe may be associated with more than one VLAN. As such, in one embodiment, links 108a-e, 112a-c may be WDM 10 GE pipes or rings.

Node 104a may be considered to be a master node, a root bridge, or a node that is designated as a master of a blocking state. A spanning-tree protocol (STP) is a layer 2 protocol defined in IEEE 802.1d, which is incorporated herein by reference in its entirety, that effectively ensures that when there are redundant paths in network 100, a loop situation does not occur. To prevent a loop from occurring within network 100, node 104a places a block 116 on link 108e such that any data to be forwarded from node 104a across links 108a-e, 112a-c is not forwarded through link 108e when traffic is flooded. Block 116 is arranged to prevent loops from occurring when traffic is flooded into network 100. To effectively place block 116, a port associated with node 104a and link 108e is placed in a blocking (BLK) state, e.g., for both ingress and egress. A port or ports associated with node 104a and links 112a, 108a is maintained in a forwarding (FWD) state. It should be appreciated that that FWD and BLK states occur at a VLAN level such that some VLANs may be protected while some other VLANs may be unprotected.

Data that enters network 100 at node 104a is generally transmitted to node 104b where the data may either exit network 100, be dropped, or be transmitted to node 104c. Similarly, at node 104c, data may exit, be dropped, or be transmitted to node 104d. Node 104d is also arranged to enable data to exit, be dropped, or be transmitted to node 104e. As shown, data may also enter network 100 at nodes 104c, 104d.

Figure 2:
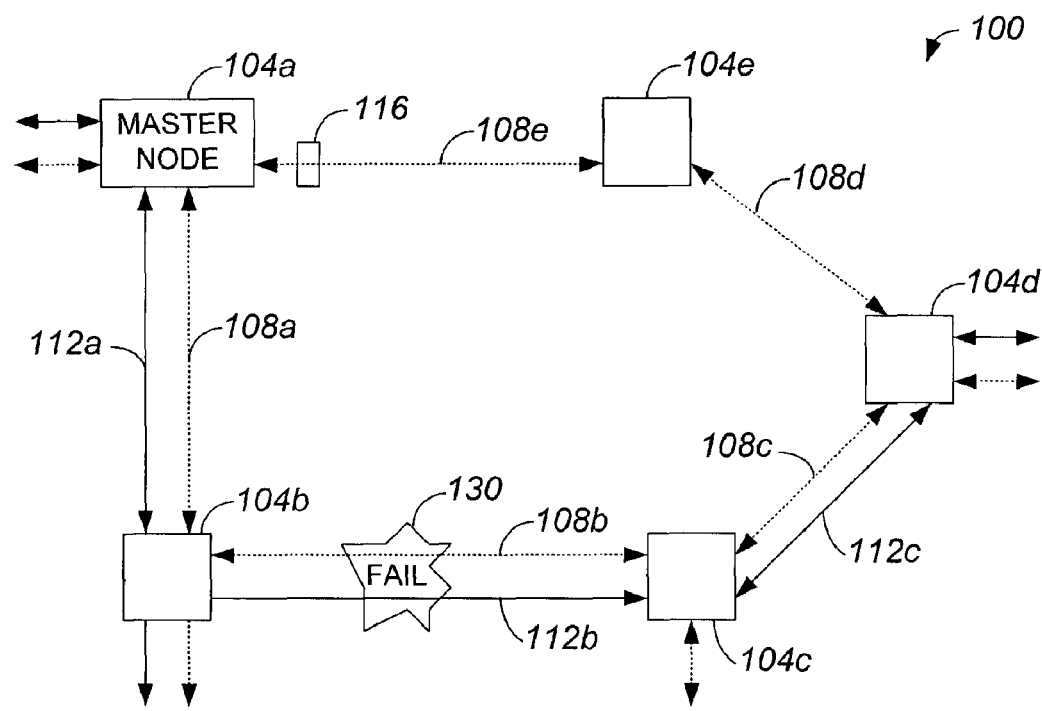
FIG. 2 is a block diagram representation of a network with a WDM ring, i.e., network 100 of FIG. 1, in which a fail has occurred in accordance with an embodiment of the present invention.

In some instances, nodes 104a-e may detect a failure within network 100. Specifically, nodes 104a-e that effectively face a failure may detect the failure. In general, a pair of nodes selected from nodes 104a-e that face a failure may be the pair of nodes between which a failure occurs. As shown in FIG. 2, a failure 130 occurs or is identified between nodes 104b, 104c which effective face failure 130. Failure 130 is generally associated with an inability to transmit information across layer 2 of the OSI standard. Hence, in network 100, failure 130 indicates that there is either a unidirectional fail or a bidirectional fail associated with links 108b, 112b that prevents information to be transmitted across layer 2 between nodes 104b, 104c. When failure 130 is a bidirectional fail, both nodes 104b, 104c face failure 130 and become aware of failure 130 substantially without receiving notification from another node 104a-e. Alternatively, when failure 130 is a unidirectional fail, only one of nodes 104b, 104c typically becomes aware of failure 130 substantially without receiving notification from another node 104a-e. The usage of a G.709 header, e.g., a BDI bit of the G.709 header, will generally allow more than one node 104b, 104c to be informed about the failure. Hence, such a failure may be considered to be bidirectional.

Figure 3:
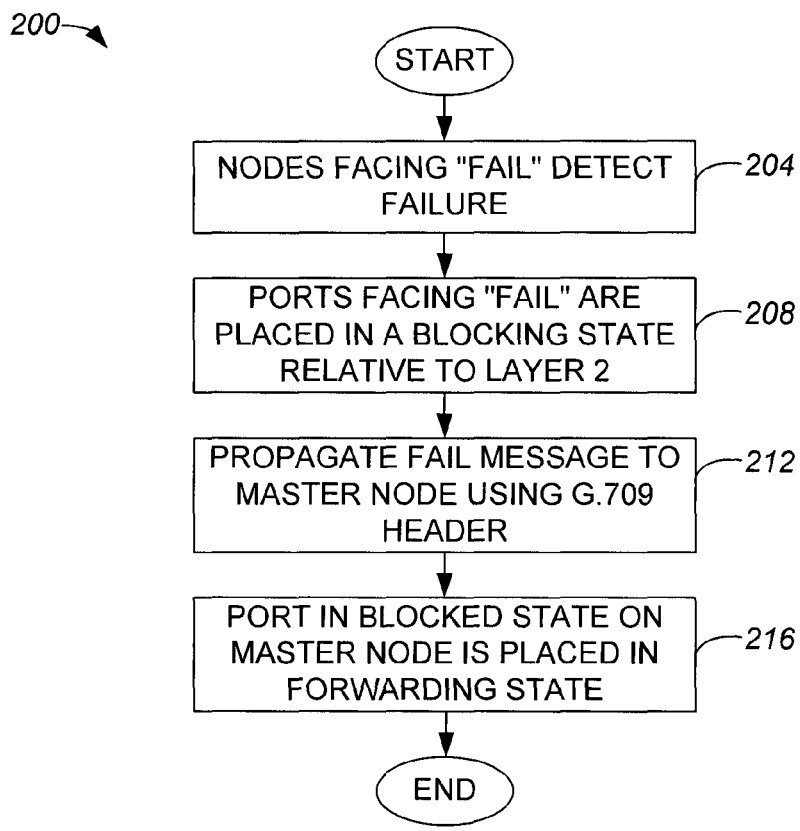
FIG. 3 is a process flow diagram which illustrates one method of processing a bidirectional fail detected within a network in accordance with an embodiment of the present invention.

When nodes 104b, 104c that face failure 130, which is a bidirectional failure in the described embodiment, detect or otherwise become aware of the existence of failure 130, nodes 104b, 104c may provide information to node 104a, i.e., the master node, that indicates that failure 130 is present within network 100. With reference to FIG. 3, one method of processing a bidirectional failure in network such as network 100 will be described in accordance with an embodiment of the present invention. A method 200 of processing a failure in a network, e.g., a network that includes a WDM ring, begins at step 204 in which nodes which face a failure or a "fail" detect the failure. A failure may be detected when one node that faces a fail expects to receive data from the other node that faces the fail, but does not receive the data. In one embodiment, polling may be performed by the nodes at predetermined intervals, e.g., at intervals of approximately 10 milliseconds) to ascertain whether there is a fail.

Once a failure is detected, the nodes which face the failure change their interface states. The interface states may be changed on a per VLAN basis. In one embodiment, the nodes that face the failure place their ports that face the failure in a BLK state in step 208. It should be appreciated that the ports that are placed in a BLK state were previously in a FWD state, and that the ports that are placed in the BLK state are ports which face the failure. When ports that face a failure are placed in a BLK state, the ports are effectively blocked relative to layer 2. After ports that face a failure are placed in a BLK state, the nodes of which the ports are a part propagate a fail message using a G.709 frame header to a master node associated with the network using hardware associated with the nodes in step 212. A fail message will typically be sent in both directions along a ring, as for example from node 104b and node 104c of FIG. 2. A G.709 frame will be described below with reference to FIG. 7. Nodes may include processing arrangements, e.g., any combination of processors and code devices that are executed by the processors, that allow the nodes to create, to send, and to receive G.709 frames.

When the master node associated with the network receives the G.709 frame in which an indication of a failure is included, as for example via intermediate nodes within the network, the port of the master node which is in a BLK state is placed in a FWD state in step 216. One port of the master node is generally maintained in a BLK state when the network is in operation to prevent a loop within network when data is flooded into the network. The port that is in the BLK state is placed in a FWD state by the master node when the master node receives a G.709 frame that indicates that a failure has been detected by nodes facing the failure. After the master node places an appropriate port in a FWD state, the method of processing a failure is completed. It should be appreciated that the overall time to complete the operation of processing a failure is generally less than approximately 50 ms.

Figure 4:
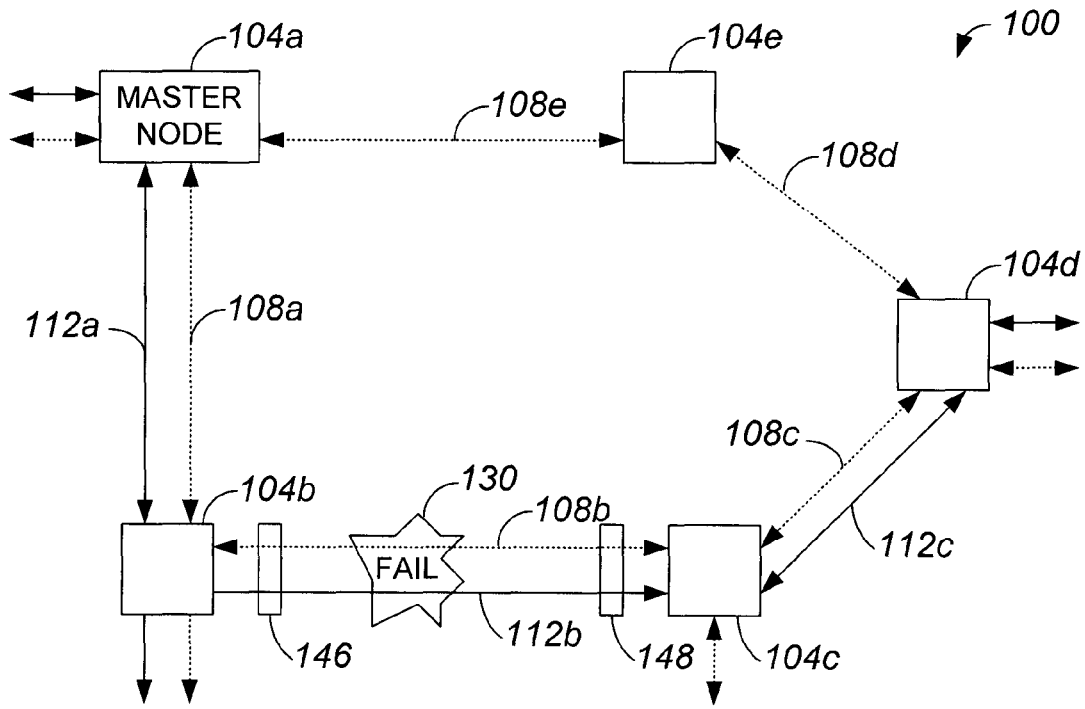
FIG. 4 is a block diagram representation of a network, i.e., network 100 of FIGS. 1 and 2, after a bidirectional fail has been processed in accordance with an embodiment of the present invention.

FIG. 4 is a block diagram representation of a network, i.e., network 100 of FIGS. 1 and 2, after a bidirectional failure has been processed in accordance with an embodiment of the present invention. Nodes 104b, 104c have placed block 146 and block 148, respectively, on links 108b, 112b to substantially isolate failure 130. Blocks 146, 148, which are associated with ports on nodes 104b, 104c being in BLK states, prevent traffic from being sent across links 108b, 112b while failure 130 is in existence. A block, i.e., block 116 of FIGS. 1 and 2, that has been removed by master node 104a. Traffic that is propagated by node 104a is prevented from entering a loop by failure 130 and blocks 146, 148.

Figure 5:
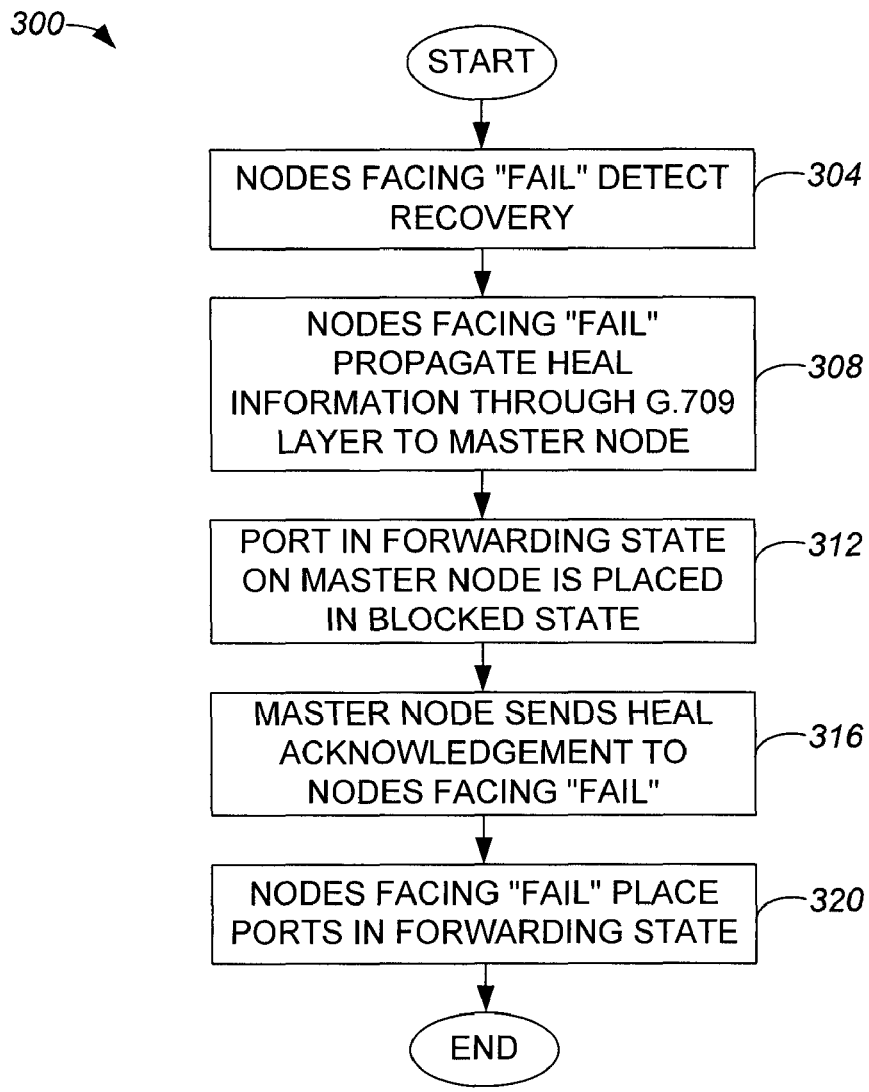
FIG. 5 is a process flow diagram which illustrates one method of processing a failure recovery in accordance with an embodiment of the present invention.

Failure 130 may be corrected or recovered using any suitable method. In other words, failure recovery methods or corrective actions may be undertaken to effectively fix failure 130. Often, a network administrator associated with network 100 will correct failure 130. Once failure 130 is corrected, blocks 146, 148 may be removed, and node 104a generally places a block on link 108e. That is, when failure 130 is no longer in existence, network 100 may be returned to a pre-failure configuration. Referring next to FIG. 5, one method of returning network 100 to a pre-failure configuration once a bidirectional failure has been corrected will be described in accordance with an embodiment of the present invention. A method 300 of returning a network to a pre-failure configuration begins at step 304 in which the nodes facing a failure, e.g., nodes 104b and 104c of FIG. 4, detect a recovery of the fail. A recovery of a fail may be detected by when the nodes facing the fail effectively poll the links associated with the fail and determine that the fail is no longer present. Alternatively, the recovery of a fail may be detected when fail alarms are no longer present. Once a recovery of the fail has been detected, the nodes facing the fail propagate heal information through layer 1, e.g., using a G.709 frame, in step 308. That is, a heal message is sent from each node that detects the recovery of a fail through a network to a master node. It should be appreciated that even if a fail is unidirectional, both nodes that face the failure will be informed that the fail has been repaired, as previously sent information in a G.709 header, e.g., BDI information sent to inform of the failure, is no longer present.

After a heal information is propagated to a master node, the master node changes the state of a port that is in a FWD state to a BLK state in step 312. In other words, an Internet port on the master node that was switched to a FWD state when a fail was detected in a network is returned to a BLK state. The master node, upon switching a port from a FWD state to a BLK state, sends a heal acknowledgement in step 316 to the nodes facing the fail, i.e., the nodes from which the heal message was received. The heal acknowledgement may be sent as an acknowledgement message using a G.709 header.

Upon receiving the heal acknowledgement, in step 320, the nodes facing the fail place their respective ports that face the fail into a FWD state. Once the ports facing the fail are placed in a FWD state, the process of returning a network to a pre-failure configuration is completed.

Figure 6A:
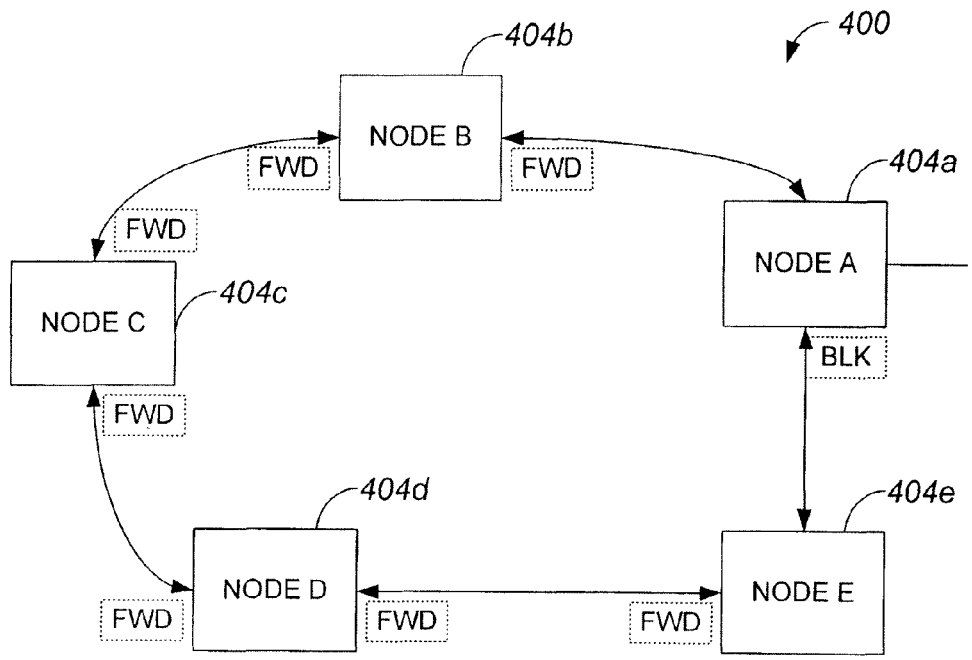
FIG. 6A is a block diagram representation of a network with a master node in accordance with an embodiment of the present invention.
Figure 6B:
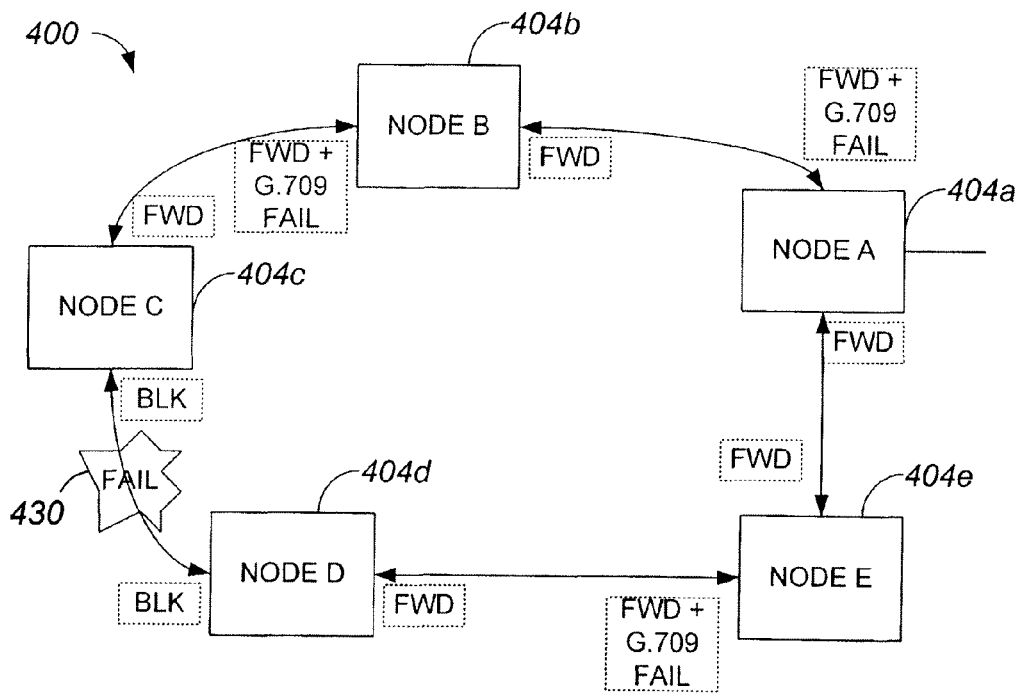
FIG. 6B is a block diagram representation of a network with a master node, i.e., network 400 of FIG. 6A, in which a unidirectional fail has occurred in accordance with an embodiment of the present invention.

A failure within a network may either be a unidirectional fail or a bidirectional fail, as previously mentioned. With reference to FIGS. 6A and 6B, the detection of a unidirectional fail between two nodes will be described in accordance with an embodiment of the present invention. Within a network 400, e.g. a network with a WDM ring, a master node 404a is in communication with a plurality of nodes 404b-e. Master node 404a has a port which faces node 404e in a BLK state such that when traffic is flooded in network 400, a loop is prevented. In other words, a transmit egress port, e.g., an Internet port, of master node 404a is logically blocked from the perspective of layer 2 of the OSI standard. However, relative to layer 1 of the OSI standard, which is a physical layer, G.709 frames may pass between master node 404a and node 404e.

As shown, a port of node 404d that faces node 404c is in a FWD state, and a port of node 404c that faces node 404d is in a FWD state. Aside from a port of master node 404a, substantially all other ports of nodes 404a-e are in a FWD state. When a unidirectional fail occurs between node 404c and node 404d, node 404d detects the unidirectional fail. FIG. 6B is a diagrammatic representation of network 400 after a unidirectional fail has been detected in accordance with an embodiment of the present invention. When a unidirectional fail 430 is detected by node 404d, node 404d inserts appropriate bits in a G.709 message that is sent to node 404c. In one embodiment, an OTUk-BDI condition is indicated in a section monitoring overhead in a G.709 frame. Such an condition may indicate that a fault has been detected. When node 404c receives the message from node 404d that indicates the existence of fail 430, node 404c places a port that faces fail 430 in a BLK state. Node 404c may also generate a G.709 message to propagate to node 404b that indicates the existence of fail 430. When node 404b receives the G.709 message, since node 404b is not a master node, node 404b propagates the message to a subsequent node, which is master node 404a in the described embodiment. Once master node 404a receives the G.709 message via node 404b, master node 404a may set a receive ingress port to a FWD state if the receive ingress port is not already set to a FWD state.

Node 404d generates a fail message by setting a bit or bits in a G.709 frame, e.g., any suitable spare bits in a G.709 frame, that is to be propagated to master node 404a to indicate that a unidirectional fail has been detected. Upon sending the G.709 frame or the G.709 fail message to master node 404a via node 404e from a layer 1 perspective, node 404d changes the state of the port, e.g., the logically blocked layer 2 port, which faces fail 130 from a FWD state to a BLK state. Master node 404a, upon receiving the G.709 frame which contains an indication that a unidirectional fail has been detected, changes the state of its port that is in a BLK state to a FWD state. That is, when master node 404a detects the G.709 fail message received from node 404d via node 404e, master node 404a moves its transmit egress port to a FWD state. It should be appreciated that master node 404a typically does not propagate any received G.709 fail messages, as master node 404a is a master of the blocking state relative to network 400.

Once master node 404a places a transmit egress port in a FWD state, network 400 operates with the transmit egress port of master node 404a in a FWD state until master node 404a is notified that fail 430 has been recovered or otherwise rectified. When fail 430 has been recovered, node 404d may identify that fail 430 has been recovered, and effectively send a fault repair indication signal to master node 404a and may clear a BDI bit in a G.709 frame that is sent to node 404c. The recovery of fail 430 may be detected by node 404d when fail alarms, as for example loss of signal or loss of frame alarms, are cleared.

A fault repair indication signal that is sent by node 404d to master node 404a via node 404e may generally be a heal message. The heal message is effectively included in an overhead area of a G.709 frame. Once node 404e receives a heal message, e.g., a G.709 message which indicates that fail 430 has been recovered, node 404e propagates the heal message to master node 404a. A G.709 frame that is sent from node 404d to node 404c which clears a BDI bit may be detected by node 404c upon receipt. In response to the cleared BDI bit, node 404c may generate a heal message which is forwarded through node 404b to master node 404a.

When a heal message is detected by master node 404a, master node 404a moves its port that faces node 404e from a FWD state to a BLK state. Master node 404a then generates a heal message acknowledgement, e.g., a G.709 message which indicates that a heal message has been received, and sends the heal message acknowledgement to node 404b and to node 404e, effectively for propagation to node 404d on layer 1.

Figure 6C:
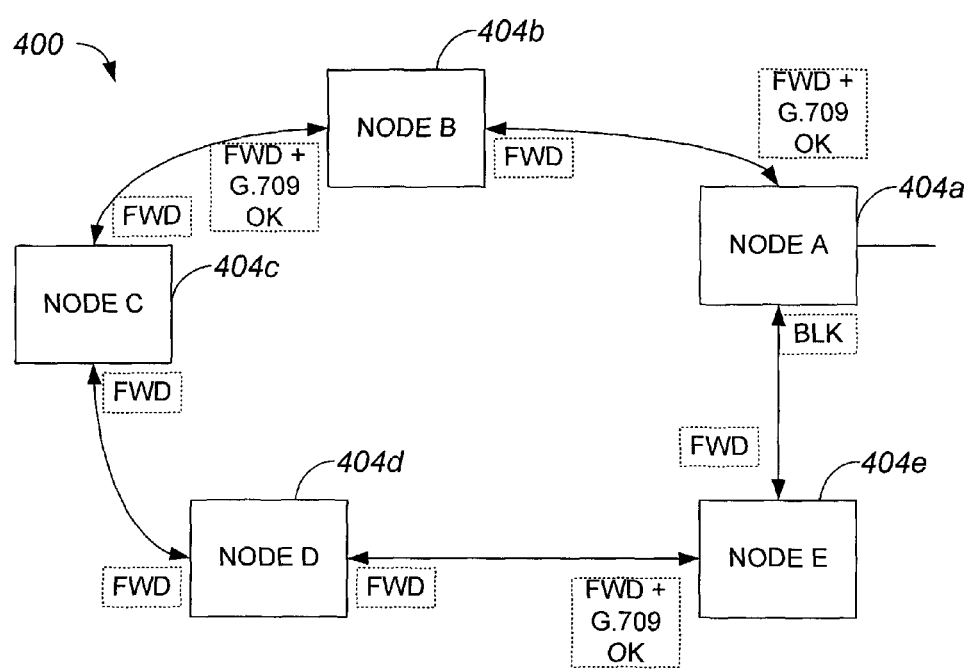
FIG. 6C is a block diagram representation of a network with a master node, i.e., network 400 of FIGS. 6A and 6B, in which a unidirectional fail has been recovered in accordance with an embodiment of the present invention.

Node 404c generally detects a heal message acknowledgement sent by master node 404a via node 404b, while node 404d generally detects a heal message acknowledgement sent by master node 404a via node 404e. Node 404c sets its port that faces node 404d to a FWD state after a heal message acknowledgement is detected, as indicated in FIG. 6C, and does not propagate the heal message acknowledgement received via node 404b. Similarly, node 404d sets its port that faces node 404c to a FWD state after a heal message acknowledgement is detected, and does not propagate the heal message acknowledgement received via node 404e.

The ability for network 400 to recover from fail 430 of FIG. 6B may either occur automatically or manually. In either case, a delay is typically instituted to prevent a loop situation. When failure recovery is substantially automatic, a port, e.g., the port of master node 404a that faces node 404e, for which a state is to be changed may be assigned a wait to restore (WTR) timer that provides a delay before the state is changed and a heal message acknowledgement is sent.

Figure 7:
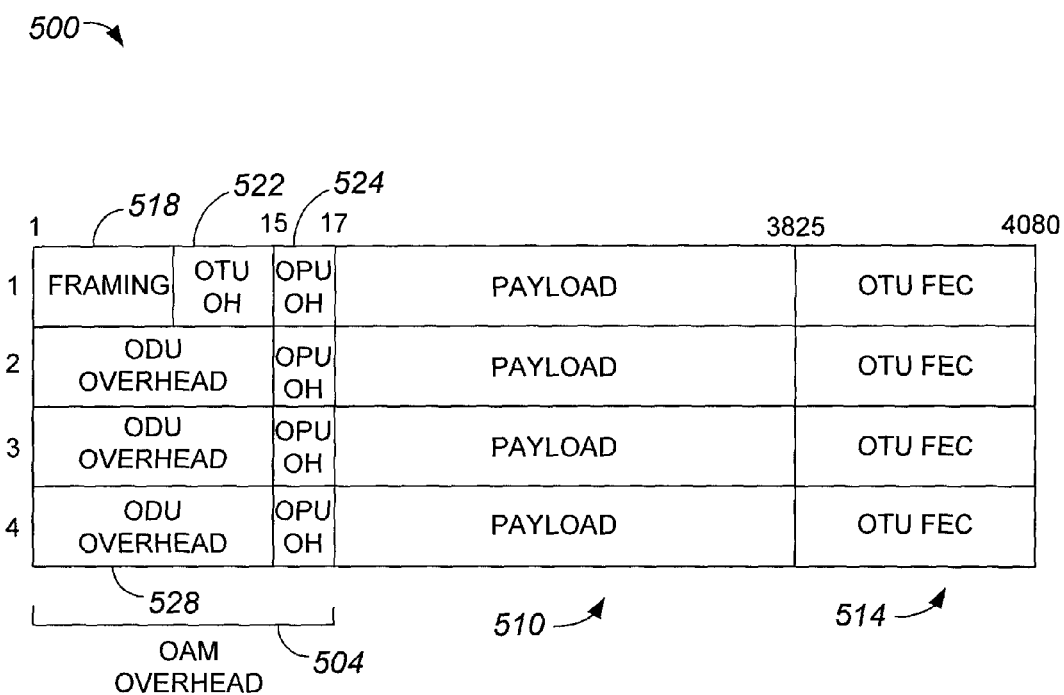
FIG. 7 is a diagrammatic representation of a G.709 frame.

As previously mentioned, overhead bits or bits in a header of a G.709 frame may be used to allow information pertaining to a detected failure to be propagated through a network. FIG. 7 is a block diagram representation of a G.709 frame as defined by the ITU-T G.709 standard. A G.709 frame 500 generally includes four rows of 4080 bytes. The bytes include bytes associated with transport overhead or operation, administration, and maintenance (OAM) overhead 504, bytes associated with a payload 510, and bytes associated with optical transport unit (OTU) forward error correction (FEC) 514. OAM overhead 504 generally includes framing bits 518, OTU overhead bits 522, optical payload unit (OPU) overhead bits 524, and optical data unit (ODU) overhead bits 528. In general, failure detection bit may be included substantially anywhere in OAM overhead 504. Similarly, other bits which indicate that a failure has been detected, any number of bits which indicate that a failure has been recovered or healed, and any number of bits which indicate that a heal message is acknowledged may be included substantially anywhere in OAM overhead 504.

Figure 8:
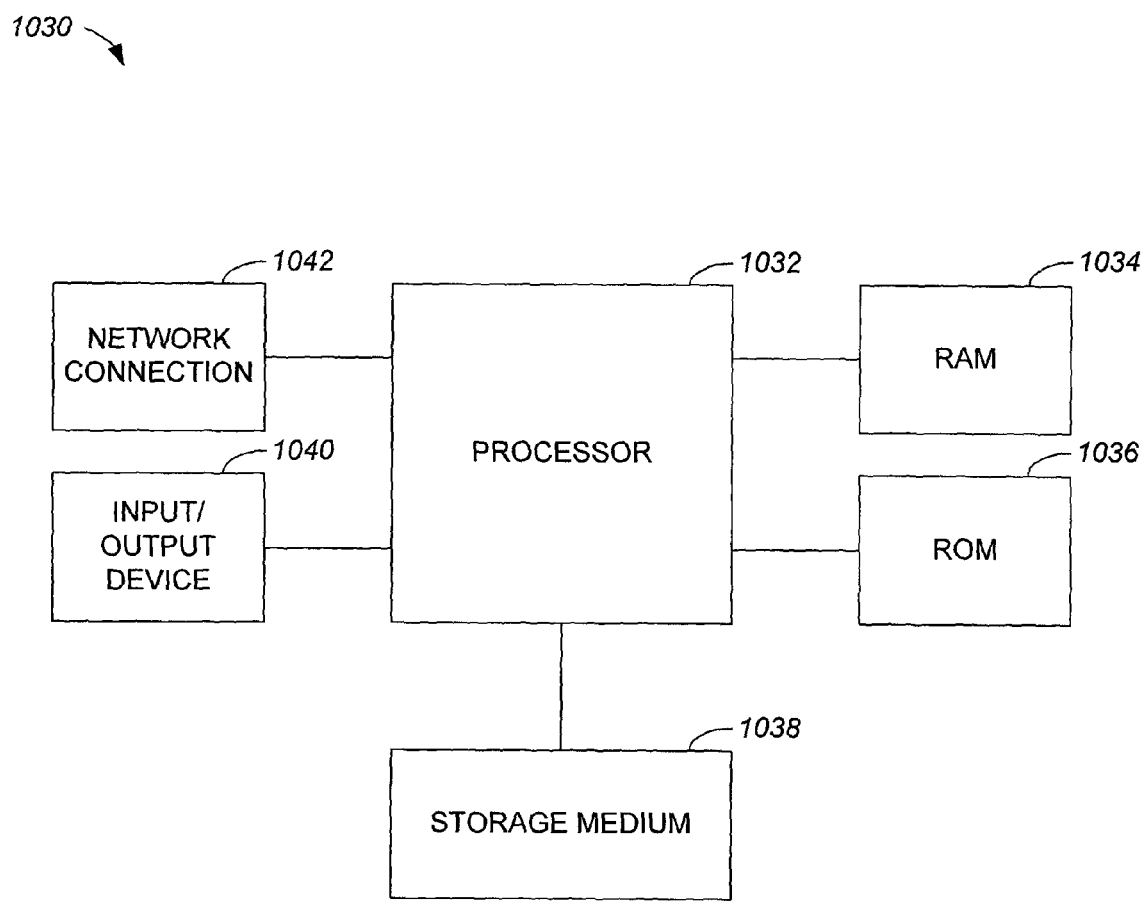
FIG. 8 is a block diagram representation of a computer system suitable for implementing the present invention.

The nodes in a network which uses G.709 messages to propagate failure detection messages, heal messages, and heal recovery messages may be substantially any network device. In one embodiment, a node may be a computing device. FIG. 8 illustrates a typical, general purpose computing device or computer system suitable for implementing the present invention. The computing device or computer system may be a part of a network element or node that is part of a WDM ring. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bidirectional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code devices, data, and the like. Typically, mass memory device 1038 is a storage medium such as, for example, a hard disk which is generally slower than primary storage devices 1034, 1036. It should be appreciated that the information retained within mass memory device 1038, may, in appropriate cases, be incorporated in standard fashion as part of RAM 1036 as virtual memory. A specific primary storage device 1034 such as a CD-ROM, a DVD, or a flash memory device may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information such as a G.709 message to the network. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the present invention has been described as being suitable for use in multicast and video distribution networks. However, the present invention may also be applied in a variety of other networks including, but not limited to, networks which utilize unicast streaming. When unicast protection without flooding is implemented, each node in a network may remove a table of media access control (MAC) addresses and flood packets for a predetermined amount of time.

A network of the present invention may generally be associated with a WDM ring over which video traffic may be distributed. In order for video traffic to be efficiently distributed throughout a network, a packet inserted or otherwise injected into the network at a node may be flooded through the ring using a single VLAN and then replicated on an appropriate GE interface.

A network that includes a WDM ring may have more than one node that is a master node or otherwise serves as a root bridge. Any master node in a WDM ring has a port that is typically in a BLK state to avoid loops relative to a layer 2 perspective. When a failure is detected within the WDM ring, a port that is typically in a BLK state may be moved to a FWD state, if appropriate.

While a failure message, a heal message, and a heal acknowledgement message have generally been described as being substantially included in an overhead or header portion of a G.709 frame, it should be appreciated that such messages may be included in a plurality of G.709. In other words, bits which indicate that a fail has been detected, that a fail has been healed, or that a heal has been acknowledges may be included in more than one G.709 frames, e.g., approximately five consecutive G.709 frames.

The propagation of a failure message, a heal message, and a heal acknowledgement message has been described as occurring in a network that includes a WDM ring. In general, the use of G.709 frames to propagate failure information, heal information, and heal acknowledgement information may occur in substantially any suitable network, as for example a network that does not include a WDM ring.

The steps associated with the methods of the present invention may vary widely. Steps may be added, removed, altered, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A device comprising:
    a plurality of ports, the plurality of ports including a first port and a second port, the first port being configurable to be in a forwarding state;
    means for identifying if the first port is interfaced with a failure associated with a network ring;
    means for generating at least a first G.709 frame, the means for generating at least the first G.709 frame being arranged to insert at least one bit into at least the first G.709 frame that indicates that the failure associated with the network ring has been identified if the first port is interfaced with the failure associated with the network ring;
    means for forwarding at least the first G.709 frame through the second port;
    means for changing a configuration of the first port from the forwarding state to a blocking state if the first port is interfaced with the failure associated with the network ring;
    means for detecting if the failure associated with the network ring has been repaired;
    means for generating a second G.709 frame with repair information;
    means for forwarding the second G.709 frame through the second port; and
    means for receiving an acknowledgement through the second port in response to forwarding the second G.709 frame.

2. A device comprising:
    a plurality of ports, the plurality of ports including a first port and a second port, the first port being initially configured to be in a blocking state such that data is transmitted using the second port and not the first port;
    means for receiving a first G.709 frame;
    means for determining if the first G.709 frame indicates that there is a failure within a network ring;
    means for configuring the first port to be in a forwarding state if the first G.709 frame indicates that there is the failure within the network ring, the forwarding state being arranged such that data is transmitted using the first port and the second port;
    means for receiving a second G.709 frame on the first port;
    means for determining if the second G.709 frame indicates that the failure within the network ring is repaired;
    means for configuring the first port to be in the blocking state if the second G.709 frame indicates that the failure within the network ring is repaired; and
    means for generating a third G.709 frame that acknowledges the second G.709 frame in response to determining that the failure within the network ring is repaired and to forward the third G.709 frame through the first port.

3. A method for propagating fault information through a wave division multiplexing ring, the method comprising:
    detecting a fault associated with a port of a first node of the multiplexing ring;
    generating at least a first G.709 frame, the first G.709 frame including at least one bit that indicates that the fault is detected;
    providing the first G.709 frame to a second port of the first node;
    forwarding the first G.709 frame from the second port to a second node of the multiplexing ring;
    setting an interface state of the first port to a blocking state;
    determining if the fault is recovered;
    generating at least a second G.709 frame, the second G.709 frame including at least one bit that indicates that the fault is recovered if it is determined that the fault is recovered;
    providing the second G.709 frame to the second port;
    forwarding the second G.709 frame from the second port to the second node,
    determining whether an acknowledgement associated with the second G.709 frame is received; and
    setting an interface state of the first port to a forwarding state if the acknowledgement is received.

4. The method of claim 3, wherein generating the G.709 frame includes inserting the at least one bit that indicates that the fault is detected into a header of the G.709 frame.

5. A method for processing fault information in a wave division multiplexing ring, the method comprising:
    receiving at least a first G.709 frame on at least one port of a plurality of ports of a first node of the multiplexing ring, the plurality of ports including a first port, the first port having an interface state that is set to a blocking state, the at least first G.709 frame including at least one bit that indicates that the fault is present within the wave division multiplexing ring;
    setting the interface state of the first port to a forwarding state;
    receiving at least a second G.709 frame, the second G.709 frame including at least one bit that indicates that the fault is repaired; and
    sending an acknowledgement message via the first port, the acknowledgement message being arranged to indicate that the at least the second G.709 frame has been received.

6. The method of claim 5, further including:
    flooding traffic into the wave division multiplexing ring through the first port and a second port of the first node.

7. The method of claim 5, further including:
    setting the interface state of the first port to a blocking state.

8. The method of claim 5, wherein the at least one bit is included in a header of the at least first G.709 frame.

9. An apparatus comprising:
    a first port and a second port, wherein the first and second ports are each configured to be in a forwarding state or in a blocking state;
    a processor configured to:
        detect a failure associated with a network ring at the first port;
        in response to detecting the failure:
            configure the first port to the blocking state;
            generate a first G.709 frame;
            insert failure information into the G.709 frame;
            forward the first G.709 frame through the second port;

detect if the failure associated with the network ring has been repaired;
in response to detecting the repair:
grenerate a second G.709 frame;
insert repair information into the second G.709 frame;
forward the second G.709 frame through the second port; and
receive an acknowledgement through the second port in response to forwarding the second G.709 frame.

10. The apparatus of claim 9, wherein the processor is configured to configure the blocking state for the first port in order to block layer 2 network communication.

11. The apparatus of claim 9, wherein the processor is further configured to reconfigure the first port to the forwarding state in response to receiving the acknowledgement.

12. The apparatus of claim 9, wherein the processor is further configured to detect a unidirectional failure associated with the network ring at the first port, and in response to detecting the unidirectional failure, generate a message that contains failure information and forward the message through the first port.

13. The apparatus of claim 12, wherein the processor is configure to generate the message in the form of a second G.709 frame that includes an optical transport unit backwards defect indication.

14. The apparatus of claim 9, wherein the processor is configured to detect the failure in a 10 Gigabit Ethernet Optical Transport Network wave division multiplexing network ring.

15. An apparatus comprising:
a first port and a second port, wherein the first port is configured to be in a blocking state such that data is transmitted using the second port and not the first port;
a processor configured to:
receive a first G.709 frame;
determine if the first G.709 frame indicates a failure within a network ring;
configure the first port to be in a forwarding state in response to determining the failure exists within the network ring such that the data is transmitted using the first port and the second port;
receive a second G.709 frame on the first port and determine if the second G.709 frame indicates the failure within the network ring is repaired; and
generate a third G.709 frame that acknowledges the second G.709 frame in response to determining that the failure within the network ring is repaired and to forward the third G.709 frame through the first port.

16. The apparatus of claim 15, wherein the apparatus is a root bridge node.

17. The apparatus of claim 15, wherein the processor is further configured to reconfigure the first port back to the blocking state after forwarding the third G.709 frame such that the data is transmitted using the second port and not the first port.

18. The device of claim 1, further comprising means for reconfiguring the first port to the forwarding state in response to the receiving acknowledgement.

19. The device of claim 1, further comprising:
means for detecting a unidirectional failure associated with the network ring at the first port; and
means for generating a message that contains failure information and forward the message through the first port in response to detecting the unidirectional failure.

* * * * *